Patented Feb. 5, 1924.

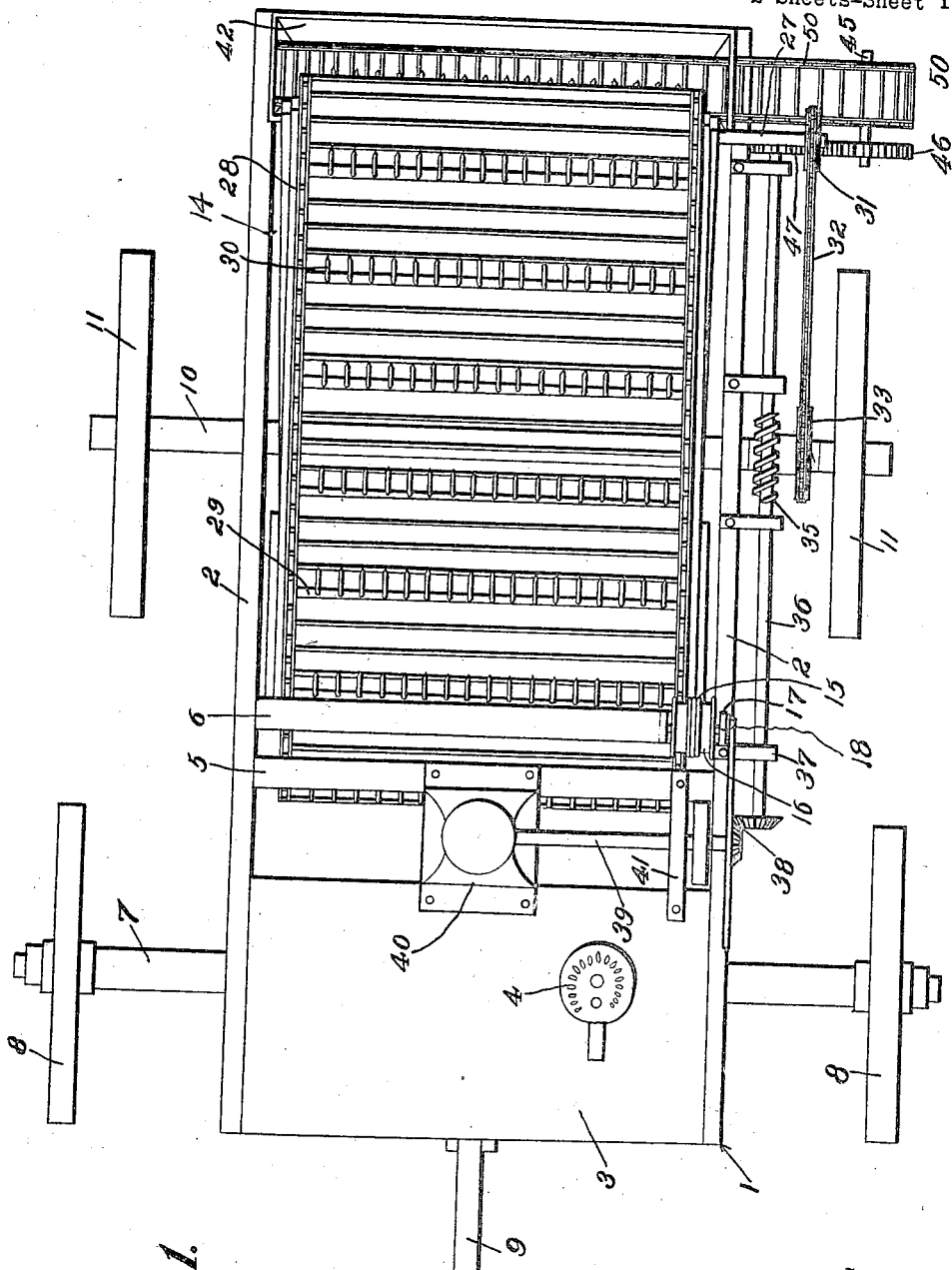

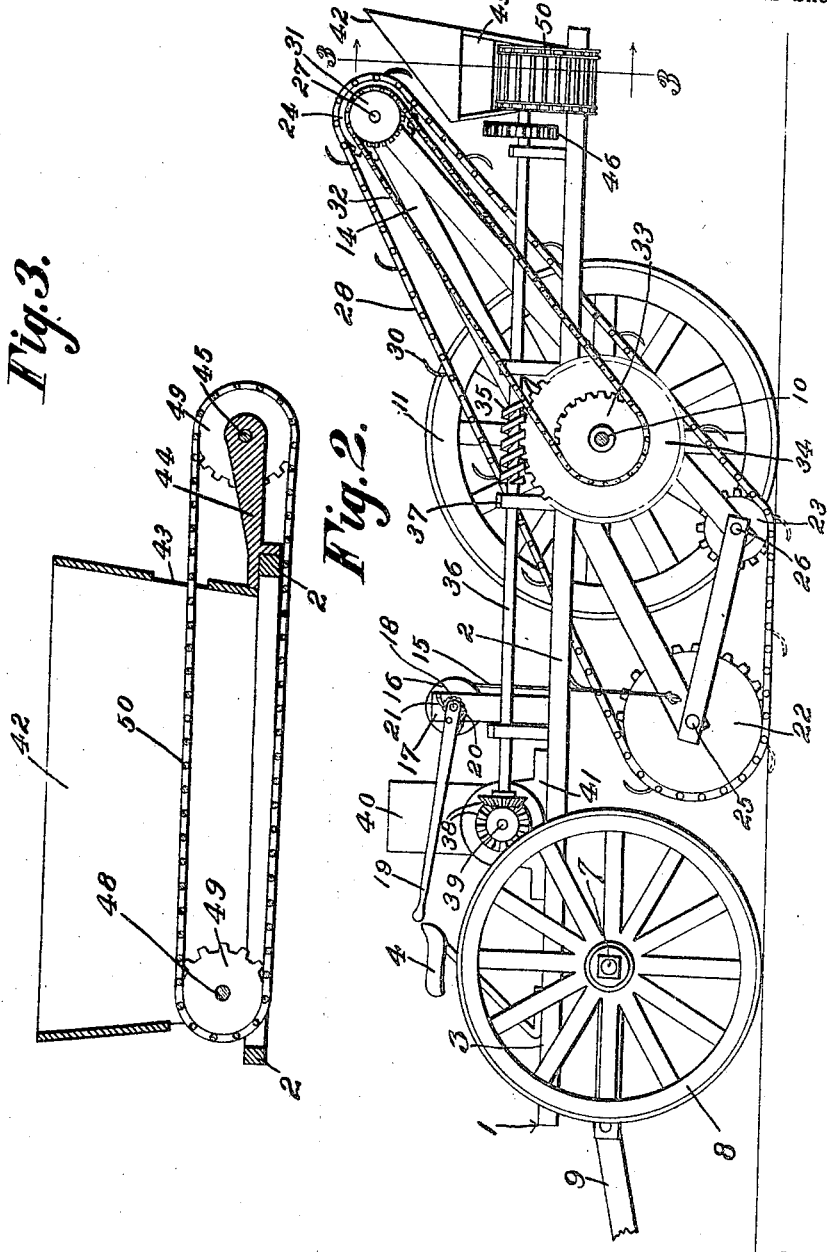

1,482,663

UNITED STATES PATENT OFFICE.

FREDERIC A. SHOULDICE, OF TRUCKSVILLE, PENNSYLVANIA.

STONE GATHERER.

Application filed January 12, 1922. Serial No. 528,736.

*To all whom it may concern:*

Be it known that I, FREDERIC A. SHOULDICE, a subject of the King of England, residing at Trucksville, in the county of Luzerne and State of Pennsylvania, have invented a new and useful Stone Gatherer, of which the following is a specification.

It is the object of this invention to provide a simple but efficient means whereby stones may be gathered from the soil, the stones being transported laterally with respect to the vehicle carrying the stone gathering means, it being possible to adjust the stone gathering instrumentalities, with respect to the surface of the soil.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is a side elevation wherein one of the rear ground wheels has been removed; and Figure 3 is a section taken approximately on the line 3—3 of Figure 2.

In carrying out the invention there is provided a main frame which may be constructed as desired. The main frame may comprise side sills 2 connected by a forward platform 3 carrying a seat 4, and by cross beams 5 and 6.

The main frame 1 carries a front axle 7 whereon ground wheels 8 are journaled. Any suitable means 9 may be supplied for drawing the frame 1. The frame 1 carries a rear axle 10 whereon ground wheels 11 are journaled.

An auxiliary frame 14 is provided, the same being of approximately triangular outline when viewed in side elevation as shown in Figure 2. The frame 14 is mounted to swing for adjustment, vertically, on the rear axle 10. A flexible element 15 is attached at one end to the lower or forward end of the auxiliary frame 14, the upper end of the flexible element 15 being wound around a drum 16 carried by a shaft 18 journaled in standards 17 erected on one of the side sills 2 and on the cross beam 6. A lever 19 is mounted to swing on the shaft 18. The lever 19 is connected operatively with the shaft 18 by a pawl and ratchet mechanism 20. A back stop pawl 21 is mounted to swing on one of the standards 17 and cooperates with the ratchet wheel of the pawl and ratchet mechanism 20.

Sprocket wheels 22 are located at the lower forward end of the frame 14, sprocket wheels 23 being located behind the sprocket wheels 22. Sprocket wheels 24 are located at the rear or upper end of the frame 14. A shaft 25 is journaled in the frame 14 and carries the sprocket wheels 22, a shaft 26 carrying the sprocket wheels 23, and a shaft 27 carrying the sprocket wheels 24. On the sprocket wheels 22, 23 and 24 is mounted a gathering conveyor comprising chains 28, slats 29 connecting the chains, and fingers 30 mounted on the slats. A sprocket wheel 31 is secured to the outer end of the shaft 27, the sprocket wheel cooperating with a sprocket chain 32 engaging a sprocket wheel 33 journaled for rotation on a portion of the rear axle 10. A worm wheel 34 is connected to the sprocket wheel 33, to rotate therewith, and is journaled on the rear axle 10. A worm 35 coacts with the sprocket wheel 34 and constitutes part of a shaft 36, extended longitudinally of the vehicle, and journaled in bearings 37 on one of the sills 2. By means of beveled pinions 38, the shaft 36 is connected operatively with a shaft 39, constituting part of an engine 40, the engine 40 being mounted on the platform 3 and on the beam 5. The engine shaft 39 extends transversely of the vehicle and is journaled in a bearing 41 extended between the platform 3 and the beam 5.

A hopper 42 is disposed transversely of the vehicle and is located at the rear thereof, the hopper being mounted on the rear ends of the side sills 2. At one end, the hopper 42 has an outlet opening 43. A bracket 44 projects outwardly from said end of the hopper 42, a shaft 45 being journaled in the bracket. There is a gear wheel 46 on the shaft 45, the gear wheel meshing into a pinion 47 secured to the shaft 36. A shaft 48 is journaled in the hopper 42 adjacent to that end of the hopper which is remote from the bracket 44. On the shafts 45 and 48 are mounted sprocket wheels 49 engaged with the chains of a transverse conveyor 50 prolonged outwardly beyond the hopper 42, through the opening 43.

In practical operation, a portion of the lower run of the gathering conveyor, comprising the chains 28 and attendant parts, moves parallel to the surface of the soil, in close relation thereto. Through the instrumentality of the lever 19, rotation may be imparted to the shaft 18 and to the drum 16, thereby reeling in or paying out the flexible element 15 so as to raise or lower the forward end of the frame 14, the frame tilting on the rear axle 10. Thus, the amount to which the fingers 30 penetrate the soil may be regulated. When it is desired to move the machine from place to place, without gathering stones, the lower portion of the gathering conveyor can be swung entirely clear of the soil. The stones are engaged by the fingers 30, and are carried upwardly and rearwardly, the stones being dumped into the hopper 42 on the conveyor 50, the conveyor 50 carrying the stones transversely of the vehicle, through the opening 43, and depositing the stones in another vehicle (not shown) which may be driven beside the wheel mounted main frame 1.

Movement is imparted to the gathering conveyor by a train of elements comprising the engine 40, the shaft 39, the beveled pinions 38, the shaft 36, the worm 35, the sprocket wheel 33, the sprocket chain 32, the sprocket wheel 31, the shaft 27 and the sprocket wheels 24. From the shaft 36 motion is transmitted to the shaft 45 by the pinion 47 and the gear wheel 46. The shaft 45 drives the conveyor 50 which carries the stones laterally out of the vehicle.

Having thus described the invention, what is claimed is:—

In a device of the class described, a wheel mounted frame, a worm wheel and a sprocket wheel mounted to rotate together on the frame intermediate the ends thereof, a shaft extended longitudinally of the frame and located exteriorly of the frame, an engine on the frame, means for connecting the engine operatively with the shaft, the engine being located at the forward end of the frame, a worm on the shaft, intermediate the ends thereof and meshing with the worm wheel, a stone gatherer within the frame and driven by the sprocket wheel, the gatherer operating parallel to the shaft, and a conveyor receiving stones from the gatherer and located at the rear of the frame, the conveyor operating transversely of the shaft, and means for operatively connecting the conveyor with the rear end of the shaft.

In testimony that I claim the foregoing as my own, I have hereto affixed my signature in the presence of two witnesses.

FREDERIC A. SHOULDICE.

Witnesses:
EDWIN C. CURTIS,
HARRIETT V. CURTIS.